United States Patent Office 3,446,758
Patented May 27, 1969

3,446,758
THERMOSETTABLE RESIN FROM PREFORMED LINEAR POLYESTER AND A POLYHYDRIC ALCOHOL
Maria V. Wiener, Akron, Ohio, assignor to The Goodyear Tire & Rubber Company, Akron, Ohio, a corporation of Ohio
No Drawing. Filed Jan. 12, 1966, Ser. No. 520,078
Int. Cl. C08g 53/22, 17/14
U.S. Cl. 260—2.3    9 Claims This invention relates to a method of treating waste or other preformed thermoplastic linear polyester resins and converting such resins into useful thermosetting polyester resins.

In the manufacture of linear condensation polyester resins some batches polymerize very slowly or polymerize to a certain degree and then do not polymerize further. Such polyester resins may be of insufficient molecular weight, may have degraded end groups, or may excessively discolored, and thus, generally not useful for the purpose for which they were intended to be used. In an economical process for producing condensation polyester resins where characteristics of the resins such as molecular weight, melting point, crosslinking, and color are critical, such resins must be reclaimed or reprocessed. According to the prior art, such scrap polyester resins are converted into lower alkyl esters of the acids from which they were derived or they are depolymerized to a liquid state and then reconverted to the desired high molecular weight resins.

According to the present invention, waste or scrap thermoplastic polymeric polyester resin is heated with a polyhydric alcohol having at least three hydroxyl groups and reacted to form a useful thermosettable polyester resin.

In the practice of the invention a thermoplastic linear polymeric polyester resin having an average intrinsic viscosity of from about 0.4 to about 1.2 and preferably from about 0.5 to about 1.0 is reacted with a polyhydric alcohol having at least three hydroxyl groups until the intrinsic viscosity of the polyester is reduced to at least below about 0.2, and polycondensed to form a thermosettable polyester resin which can be crosslinked to form a thermoset polyester resin.

The temperature at which the resin and the polyhydric alcohol are heated can be varied over a wide range. The heating is generally carried out at a temperature above the glass transition temperature of the linear thermoplastic polyester resin and below the temperature at which substantial amounts of the reactants decompose. When crystallizable thermoplastic polyesters are treated, the temperature used is preferably in the range of from about 20° C. below the melting point of the thermoplastic polyester resin to about 20° C. above its melting point, although higher or lower temperatures can be used if desired. The polyester is heated with the polyhydric alcohol until the mixture forms a clear melt having an intrinsic viscosity below about 0.2 and generally below about 0.1. This mixture is then polycondensed until it attains a molectular weight just below the molecular weight at which it gels. This polymer usually has an intrinsic viscosity in the range of from about 0.15 to about 0.6 and generally from about 0.25 to about 0.5. If desired, a catalyst can be added to promote the polycondensation reaction although the catalyst residue originally present in the resin being treated may suffice for polycondensation of the thermosettable polyester. Various catalysts useful in polycondensation reactions may be used. Representative of these catalysts are litharge, antimony trioxide, glycol titanate, as well as other well known polycondensation catalysts.

The polycondensation conditions are adjusted so that a major portion of the added polyhydric alcohol used is retained in the polycondensation product. This is accomplished by utilizing polymerization conditions at which diol units contained in the original thermoplastic polyester resin can be removed and replaced by the added polyhydric alcohol.

Thus, a thermosettable polyester resin can be prepared having free crosslinkable hydroxyl groups wherein the amounts of such hydroxyl groups can be controlled by the ratio of the polyhydric alcohol used to the diol contained in the original thermoplastic polyester resin.

This prepared thermosettable polymeric polyester can then be converted into a thermoset polymeric polyester resin by heating the polymer to cause crosslinks to occur. Thus, in the practice of this invention a thermoset polymeric polyester resin is prepared having a controlled degree of crosslinking. This crosslinking is controlled by adjusting the ratio of the polyhydric alcohol used to treat the original thermoplastic polymeric polyester resins to the diol contained in the original thermoplastic polymeric polyester resin.

For example, poly (ethylene terephthalate) treated according to this invention with glycerin to form thermosettable polymers having from about 0.25 mol to about 0.6 mol of glycerine for each mol of acid unit of the poly (ethylene terephthalate), can be heated to form thermoset polyester resins which vary from somewhat flexible resins to resins which are brittle in nature. Thus, such a prepared thermosettable polymeric polyester having about 0.25 mol of glycerine for each mol of acid unit in the poly (ethylene terephthalate) can be heated to form a thermoset polyester resin which is somewhat flexible and can be used as a covering for an electrical wire which may be subjected to some flexing. Also, such a prepared thermosettable polymeric polyester having about 0.6 mol of glycerine for each mol of acid unit in the poly (ethylene terephthalate) can be heated to form a thermoset polyester resin which tends to be hard and brittle, has good electrical insulating properties, and can be used as a coating for various metals or as an electrically insulative covering for electrical conductors.

Various thermoplastic polyester resins can be treated by this invention. Such thermoplastic polyesters are linear polymeric polyesters derived from at least one diol and at least one dicarboxylic acid. The polyester can be derived from various diols and mixtures of diols. Representative examples of such diols are the alkylene glycols such as ethylene glycol, propylene glycol, neopentyl glycol; the butylene glycols; pentamethylene glycol and the higher glycol homologues; and cyclic diols such as cyclohexane dimethanol. The polyesters can be derived from various dicarboxylic acids and mixtures of dicarboxylic acids. Representative examples of such acids are aromatic dicarboxylic acids such as terephthalic acid, isophthalic acid, orthophthalic acid, the various isomers of naphthalene dicarboxylic acid, and the various isomers of biphenyl dicarboxylic acid; aliphatic dicarboxylic acids such as adipic acid, suberic acid, azelaic acid and sebacic acid; and cyclo-aliphatic dicarboxylic acids such as cyclohexane dicarboxylic acid.

In carrying out the invention various polyhydric alcohols can be used. Representative examples of such polyhydric alcohols are polyhydric alcohols containing three hydroxyl groups such as glycerin, trimethylolethane, trimethylolpropane and polyhydric alcohols containing four hydroxyl groups such as pentaerythritol. Generally the polyhydric alcohol used has a boiling point higher than the boiling point of the diol contained in the thermoplastic polyester resin. If desired, a mixture of polyhydric alcohol and a diol may be used. When such a mixture is used, it is usually desirable to mix the polyhydric alcohol with up to about 0.5 mol of the diol per mol of acid units in the thermoplastic polyester resin. It is preferred that this diol has a boiling point higher than the diol used to prepare the original thermoplastic polymeric polyester resin. Various diols can be mixed with the polyhydric alcohol, representative examples of such diols are glycols such as propylene glycol, neopentyl glycol, the butylene glycols, pentamethylene glycol and higher glycol homologues and cyclic diols such as cyclohexane dimethanol.

The following examples illustrate the practice of the invention and are not intended to be limiting. In these examples, parts and percentages are by weight unless otherwise indicated.

Example I

A small glass reactor tube was charged with 38.4 parts of poly (ethylene terephthalate) having an intrinsic viscosity of 0.79 and 6.44 parts of glycerin. The poly (ethylene terephthalate) had been prepared by an ester exchange and condensation reaction of dimethyl terephthalate and ethylene glycol, using as a catalyst 0.03 weight percent zinc acetate and 0.025 weight percent $Sb_2O_3$, based on the weight of dimethyl terephthalate used. Nitrogen gas was passed into the tube and the mixture was stirred and heated by a vapor bath having a temperature of 280° C. Within ten minutes a clear, homogeneous melt having an intrinsic viscosity of below 0.1 was obtained. The vapor bath was then replaced by a different bath having a temperature of 245° C., and the pressure in the reactor was slowly reduced to one millimeter of mercury over a period of time of about 25 minutes. Under these conditions the melt was polycondensed with evolution of ethylene glycol to a polymeric polyester having an intrinsic viscosity of 0.17 within about 10 minutes. Atmospheric pressure was rapidly reestablished with nitrogen and the polymer removed from the reactor. The polymer was analyzed and found to contain ethylene glycol units and glycerin units in a molar ratio of 69 ethylene glycol units to 31 glycerin units.

The polyester was rapidly cooled to about 24° C. after removal from the reactor. It was then ground into small particles and placed in a fluid bed apparatus. The particles were fluidized at about 24° C. with a stream of nitrogen. A steel wire was heated to about 245° C. and inserted into the fluidized bed. After a coating of the polymeric polyester adhered to the steel wire, the wire was withdrawn from the fluidized bed and placed in a forced air oven for 30 minutes at a temperature of 245° C. during which the polyester was converted to a crosslinked, insoluble, and infusible coating that had good electrical insulating properties.

Example II

A small glass reaction tube was charged with 6.44 parts of glycerin, 2.88 parts of 1,4 trans/cis cyclohexanedimethanol having a trans/cis structure ratio of 70 to 30 and 38.4 parts of poly (ethylene terephthalate) having an intrinsic viscosity of 0.65. The poly (ethylene terephthalate) had been prepared by an ester exchange and condensation reaction of dimethyl terephthalate and ethylene glycol using as a catalyst 0.03 weight percent zinc acetate and 0.025 weight percent $Sb_2O_3$, based on the weight of dimethyl terephthalate. Nitrogen gas was passed into the tube and the mixture was stirred and heated by a vapor bath having a temperature of 280° C. Within ten minutes a clear, homogeneous melt having an intrinsic viscosity below 0.1 was obtained. The bath was then replaced by a different vapor bath having a temperature of 245° C., and the pressure in the reaction tube slowly reduced to one millimeter of mercury over a period of about twenty-five minutes. Under these conditions the melt was polycondensed with evolution of ethylene glycol to form a polymeric polyester having an intrinsic viscosity of 0.35 within about fifteen minutes. Atmospheric pressure was re-established with nitrogen and the polymer was removed from the reactor. The polymer contained units of terephthalic acid, ethylene glycol, 1,4 trans/cis cyclohexanedimethanol and glycerin. The polymer was coated onto a steel wire and crosslinked according to the method of Example I to form a crosslinked, insoluble, and infusible coating having good electrical insulating properties.

These examples illustrate methods of recovering a waste polyester resin and converting it into thermosettable and thermoset polymeric polyester resins. It will be understood by those skilled in the art that reaction conditions can be varied over a wide range. For example, in the practice of this invention a linear polyester resin such as poly (ethylene terephthalate) having an intrinsic viscosity of from about 0.5 to about 1.0 can be treated at about atmospheric pressure with glycerin at a temperature of from about 150° C. to about 300° C., and preferably from about 180° C. to about 280° C., to reduce the polymer to an intrinsic viscosity below about 0.2 and preferably below about 0.1. Under these conditions, usually from about 0.25 to about 0.6 and preferably from about 0.3 to about 0.5 mol of glycerine are used for each mol of acid unit of the poly (ethylene terephthalate.) Such acid units in this instance are those derived from the acid units of terephthalic acid. Generally the time required to degrade the polyester at lower temperatures, particularly at temperatures below the melting point of the polyester, will be longer. It is obvious that temperatures suitably used for other polyesters will vary also, depending on their melting points and other appropriate reaction variables. After the polyester is reduced to the desired viscosity, the mixture is polycondensed to form a thermosettable polyester having an intrinsic viscosity of from about 0.15 to about 0.6 by subjecting the mixture to a temperature of from about 150° C. to about 300° C. at a pressure of from about 760 millimeters to about 0.5 millimeter of mercury to remove a portion of the ethylene glycol. The resulting thermosettable polymeric polyester can be coated on an electrical conductor, such as a copper, steel, or aluminum wire or other conductor, and heated to cause the polyester to crosslink forming a thermoset polyester resin insulative coat on the conductor.

The method of this invention thus will generally be used in treating a waste or scrap polymeric polyester to convert it into a useful material. However, the method can be generally used with a pre-formed linear thermoplastic polymeric polyester and is not limited to treatment of a scrap polyester to form new useful polyesters.

The intrinsic viscosities referred to were determined at 30° C. in a mixture comprising a concentration of 0.4 gram of polyester resin in 100 cubic centimeters of a solution of the resin in a mixed solvent comprising 60 percent by weight phenol and 40 percent by weight tetrachloroethane.

While certain representative embodiments and details have been shown for the purpose of illustrating the invention, it will be apparent to those skilled in this art that various changes and modifications may be made therein without departing from the spirit or scope of the invention.

What is claim is:

1. A method comprising treating a pre-formed thermoplastic linear polymeric polyester resin having an intrinsic viscosity of from about 0.4 to about 1.2 by reacting a polyhydric alcohol having at least three hydroxyl groups therewith and polycondensing the treated polymeric polyester in the presence of the said polyhydric alcohol to form a thermosettable polyester resin having an intrinsic viscosity of from about 0.15 to about 0.6, wherein the said pre-formed thermoplastic linear polymeric polyester resin is derived from at least one diol selected from the group consisting of alkylene glycols and cyclohexane dimethanol and at least one dicarboxylic acid selected from the group consisting of aromatic dicarboxylic acids, aliphatic dicarboxylic acids and cycloaliphatic dicarboxylic acids.

2. A method according to claim 1 wherein said linear thermoplastic polymeric polyester resin is treated with said polyhydric alcohol at a temperature above the glass transition temperature of the said linear thermoplastic polymeric polyester resin and below the decomposition temperature of the reactants.

3. A method according to claim 1 wherein the linear thermoplastic polymeric polyester resin is poly (ethylene terephthalate) having an intrinsic viscosity of from about 0.5 to about 1.0, and the said polyhydric alcohol is glycerin.

4. A method according to claim 1 wherein the linear thermoplastic polymeric polyester resin is treated with a mixture comprising at least one polyhydric alcohol having at least three hydroxyl groups and at least one diol, the said diol having a boiling point higher than the boiling point of the diol used to prepare the pre-formed thermoplastic linear polymeric polyester resin.

5. A method according to claim 4 wherein the polyhydric alcohol is glycerine and the said diol is 1,4 trans/cis cyclohexanedimethanol.

6. A method according to claim 2 wherein the thermosettable polyester resin is heated to form a thermoset polyester resin.

7. A method according to claim 6 wherein the thermosettable polyester resin is prepared by treating poly (ethylene terephthalate) having an intrinsic viscosity of from about 0.5 to about 1.0 with glycerine to form a product having intrinsic viscosity of less than about 0.2, and polycondensing the product in the presence of the glycerine.

8. A method according to claim 1 in which poly (ethylene terephthalate) having an intrinsic viscosity of from about 0.5 to about 1.0 is treated with from about 0.25 to about 0.6 mol of glycerine for each mol of acid unit in the poly (ethylene terephthalate) at a temperature of from about 150° C. to about 300° C. to form a product having an intrinsic viscosity below 0.2, and polycondensed at a temperature of from about 150° C. to about 300° C. at a pressure in the range of from about atmospheric pressure to about 0.5 millimeter of mercury pressure to remove a portion of the ethylene glycol and to form a polyester having an intrinsic viscosity of from about 0.15 to about 0.6.

9. A method according to claim 8 wherein the said thermosettable polymer is coated onto an electrical conductor and heated to form a thermoset polymeric resin.

References Cited

UNITED STATES PATENTS

| | | | |
|---|---|---|---|
| 3,222,299 | 12/1965 | MacDowell | 260—2.3 |
| 3,257,335 | 6/1966 | Whitfield et al. | 260—2.3 |
| 3,344,091 | 9/1967 | Russin et al. | 260—2.3 |
| 3,350,328 | 10/1967 | Cappuccio et al. | 260—2.3 |
| 3,249,652 | 5/1966 | Quisenberry | 260—75 |
| 2,936,296 | 5/1960 | Precopio et al. | 260—75 |
| 1,950,468 | 3/1934 | Zwilgmeyer | 260—75 |

FOREIGN PATENTS 762,690  12/1956  Great Britain.

WILLIAM H. SHORT, *Primary Examiner.*

M. GOLDSTEIN, *Assistant Examiner.*

U.S. Cl. X.R.

117—128.4; 260—75